US012359632B1

(12) United States Patent
Baldwin et al.

(10) Patent No.: US 12,359,632 B1
(45) Date of Patent: Jul. 15, 2025

(54) DUAL FUEL SYSTEM HAVING OVERFLOW BUFFER FOR HASTENING FUEL SWITCHOVER

(71) Applicant: Caterpillar Inc., Peoria, IL (US)

(72) Inventors: Daniel R. Baldwin, Mossville, IL (US); Eric Lee Schroeder, Germantown Hills, IL (US); Bryan Edward Nelson, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/788,520

(22) Filed: Jul. 30, 2024

(51) Int. Cl.
*F02D 19/06* (2006.01)

(52) U.S. Cl.
CPC ..... *F02D 19/0694* (2013.01); *F02D 19/0676* (2013.01); *F02D 19/0681* (2013.01); *F02D 19/0684* (2013.01)

(58) Field of Classification Search
CPC ............. F02D 19/0684; F02D 19/0681; F02D 19/0676; F02D 19/0694
See application file for complete search history.

(56) References Cited

U.S. PATENT DOCUMENTS

| | | | |
|---|---|---|---|
| 2,927,562 A | 3/1960 | Lafferty et al. | |
| 11,047,297 B2 | 6/2021 | Harknett et al. | |
| 11,384,721 B1 * | 7/2022 | Schroeder | F02M 57/023 |
| 11,585,303 B2 | 2/2023 | Wloka et al. | |
| 2016/0146123 A1 | 5/2016 | Seo | |
| 2018/0347456 A1 * | 12/2018 | Magnusson | F02D 41/003 |
| 2024/0044308 A1 | 2/2024 | Schroeder et al. | |

FOREIGN PATENT DOCUMENTS

| | | |
|---|---|---|
| KR | 101490717 B1 | 2/2015 |

* cited by examiner

*Primary Examiner* — Kevin A Lathers
(74) *Attorney, Agent, or Firm* — Brannon Sowers & Cracraft PC

(57) ABSTRACT

A dual fuel system for an internal combustion engine includes a plurality of fuel injectors, a first fuel pump and a first fuel conduit extending to the plurality of fuel injectors, and a second fuel pump and a second fuel conduit extending to a fuel manifold fluidly connected to the plurality of fuel injectors. The dual fuel system also includes an overflow buffer arranged to receive a volume of the second fuel expelled from the second fuel conduit, and a valve movable from a closed position to an open position fluidly connecting the overflow buffer to the second fuel conduit. Expelling fuel from the second fuel conduit enables a rapid pressure drop in a supply pressure of the second fuel to hasten switchover of the internal combustion engine between fuel type.

20 Claims, 3 Drawing Sheets

DUAL FUEL SYSTEM HAVING OVERFLOW BUFFER FOR HASTENING FUEL SWITCHOVER

TECHNICAL FIELD

The present disclosure relates generally to a dual fuel engine system, and more particularly to releasing fuel pressure to a buffer to hasten switchover between fuel types.

BACKGROUND

Dual fuel systems are well known and widely used throughout the world in a variety of internal combustion engine applications. Engineers have developed a number of different strategies over the years enabling an engine to operate on a first fuel, a second fuel, a blend of a first fuel and a second fuel, and in some implementations even more than two fuel types.

Some dual fuel engines operate using a relatively small pilot charge of a compression-ignition liquid fuel to ignite a larger main charge of a gaseous fuel. In recent years, engineering efforts have been increasingly directed at dual liquid fuel strategies such that the engine can operate on one or the other of two liquid fuel types, and sometimes blends, depending upon application and performance requirements. Typically the multiple different fuel types have different properties such as levels of certain emissions when combusted, energy density, or other factors such as availability and cost.

Engines are traditionally configured to operate optimally upon a single fuel type. Different injection pressures and injection amounts, injection timing, and ignition timing may be necessary depending upon fuel type to obtain optimal performance and emissions levels. For instance, certain engine platforms are arranged to operate using liquid methanol some of the time, but at least occasionally operating on diesel in a so-called "diesel-only mode" to obtain optimal performance and in particular respond to transient load changes. Despite much promise in this technical field, there remain a number of challenges including, for example, difficulty in rapidly switching over an engine system from operation on one fuel type to operation on another fuel type. One known dual fuel engine strategy is set forth in United States Patent Application Publication No. 20240044308A1 to Schroeder et al.

SUMMARY

In one aspect, a dual fuel system includes a plurality of fuel injectors, a first fuel pump for a first fuel, and a first fuel conduit extending between the first fuel pump and the plurality of fuel injectors, a second fuel pump for a second fuel, and a second fuel conduit extending between the second fuel pump and a fuel manifold fluidly connected to the plurality of fuel injectors. The dual fuel system further includes an overflow buffer arranged to receive a volume of the second fuel expelled from the second fuel conduit, and a valve movable from a closed position to an open position fluidly connecting the overflow buffer to the second fuel conduit.

In another aspect, a dual fuel engine system includes an engine having an engine housing with a plurality of cylinders formed therein, and a dual fuel system. The dual fuel system includes a first fuel conduit for a first fuel, a second fuel conduit for a second fuel, and a plurality of fuel injectors arranged to inject the first fuel and the second fuel into the engine for combustion in the plurality of cylinders. The dual fuel system further includes an overflow buffer, and a normally closed valve movable from a closed position to an open position fluidly connecting the second fuel conduit to the overflow buffer.

In still another aspect, a method of operating an engine system includes feeding a fuel having a first fuel composition into a plurality of fuel injectors, and injecting the fuel having the first fuel composition from the plurality of fuel injectors into the engine for combustion. The method further includes feeding a fuel having a second fuel composition into the plurality of fuel injectors, and injecting the fuel having the second fuel composition from the plurality of fuel injectors into the engine for combustion. The method still further includes opening a valve to expel the fuel having the first fuel composition from a fuel supply conduit to an overflow buffer, and hastening switchover of the engine from operation on the fuel having the first fuel composition to operation on the fuel having the second fuel composition, based on the opening the valve to fluidly connect the fuel supply conduit to the overflow buffer.

DETAILED DESCRIPTION

Figure 1:
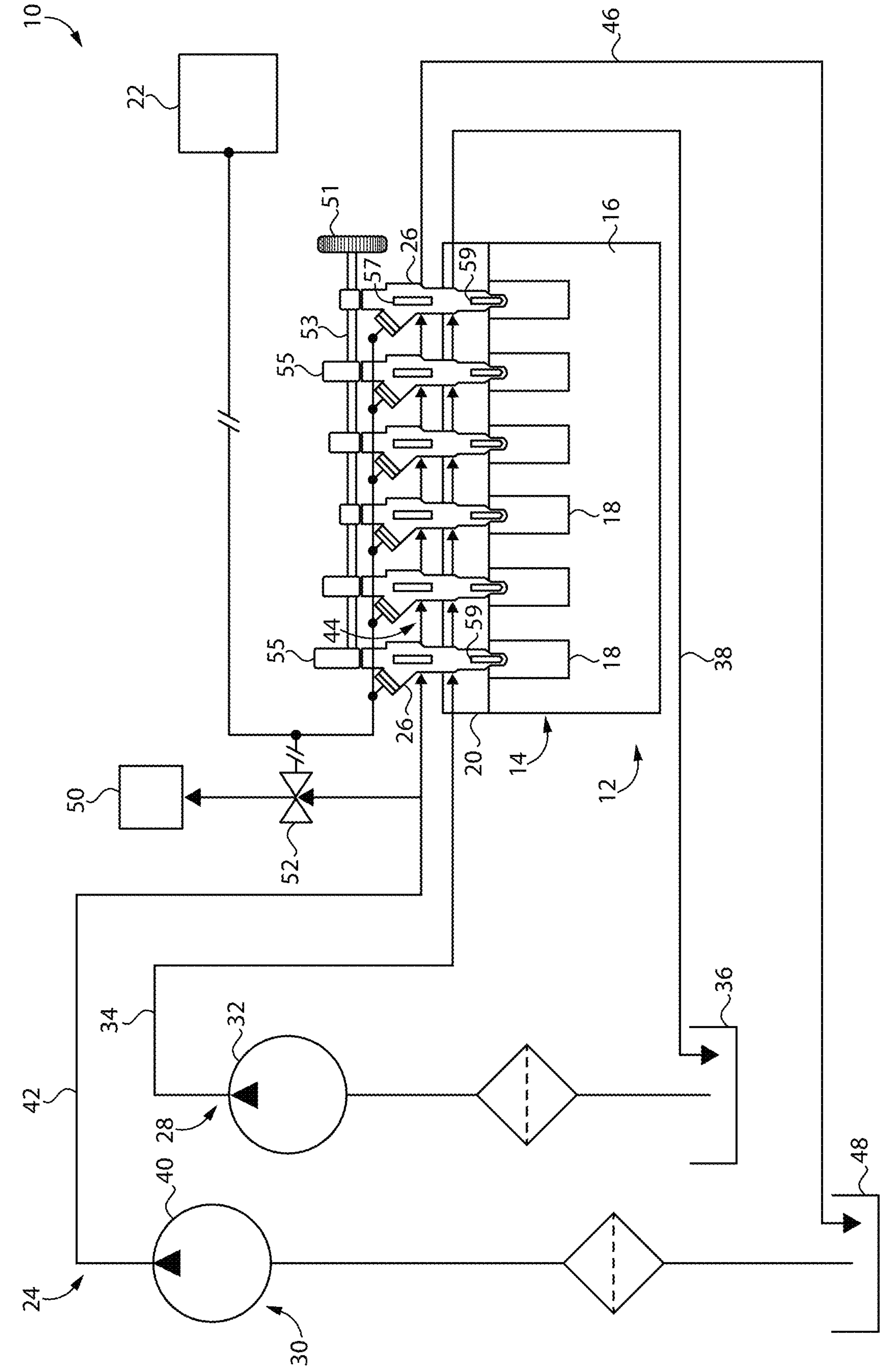
FIG. 1 is a diagrammatic view of an internal combustion engine, according to one embodiment.

Referring to FIG. 1, there is shown a dual fuel internal combustion engine system 10, according to one embodiment. Engine system 10 includes a dual fuel internal combustion engine 12 having an engine housing 14 with a cylinder block 16. A plurality of cylinders 18 are formed in cylinder block 16, including any number of cylinders in any suitable arrangement such as an inline pattern, a V-pattern, or in still another. Cylinders 18 will be conventionally equipped with pistons coupled to a rotatable crankshaft operable to power a load. Engine system 10 can be applied to operate a pump, a compressor, an electrical generator, or a driveline in a land vehicle or marine vessel to name a few examples. Engine housing 14 further includes a cylinder head 20 attached to cylinder block 16. Cylinder head 20 will be conventionally equipped with intake ports, exhaust ports, intake valves, exhaust valves, and passages for coolant.

Engine system 10 further includes a dual fuel system 24. Dual fuel system 24 includes a plurality of fuel injectors 26. In the illustrated embodiment fuel injectors 26 are direct fuel injectors each extending into a respective one of cylinders 18. In other implementations, fuel injectors 26 could include port fuel injectors, or fuel injectors in intake runners extending to cylinder head 20, for example. Dual fuel system 24 may also include a plurality of fuel pressurization plungers 57 each positioned within, or otherwise directly associated with, a respective one of fuel injectors 26. Each of fuel injectors 26 may also include an outlet check 59 structured to open and close a plurality of fuel spray orifices. In some embodiments, a single outlet check will be used in each fuel injector to selectively inject each one of two, or potentially more than two, liquid fuels. In other implementations each fuel injector could be equipped with more than one outlet check and more than one set of spray orifices.

Engine system 10 also includes a cam gear 51 coupled to a camshaft 53 having a plurality of cams 55. Cam gear 51 can be rotated via an engine geartrain to cause cams 55 to actuate plungers 57, again according to generally known techniques. Each fuel injector 26 may also include an electrically actuated injection control valve that directly controls a closing hydraulic pressure on the respective outlet check 59.

Dual fuel system 24 can be configured to supply two different fuels to engine 12, and in some embodiments can be configured to supply a blend of two different fuels potentially at a selectable blend ratio. In some instances, more than two fuel types might be provided, at times, by dual fuel system 24 to engine 12. Thus, description herein of a "dual" fuel system is understood not as a limitation to a number or type of fuels, but merely to mean that dual fuel system 24 supplies at least two different fuel compositions, as further discussed herein.

To this end, dual fuel system 24 includes a first fuel subsystem 28, and a second fuel subsystem 30. First fuel subsystem 28 includes a first fuel pump 32 for a first fuel, and a first fuel supply conduit 34 extending between first fuel pump 32 and fuel injectors 26. First fuel subsystem 28 also includes a first fuel supply 36 containing a first liquid fuel, and a drain conduit 38 extending from engine 12 to return drained fuel to first fuel supply 36. Second fuel subsystem 30 includes a second fuel pump 40 for a second fuel, and a second fuel supply conduit 42 extending between second fuel pump 40 and a fuel manifold 44 fluidly connected to fuel injectors 26. Second fuel subsystem 30 also includes a second fuel supply 40 containing a second fuel, and a drain conduit 46 to return drained fuel to second fuel supply 46.

In an embodiment, the first fuel includes a diesel distillate fuel, and the second fuel includes methanol. In other instances, the first fuel could be another higher cetane compression-ignition fuel such as JP8, and the second fuel could be a different alcohol fuel. Still other arrangements could employ gasoline, ethanol, various blends. One embodiment contemplates that the first fuel includes a lower cetane number fuel blended with a cetane enhancer, and the second fuel includes the same or a different lower cetane number fuel without a cetane enhancer. Engine system 10 could also include sparkplugs in cylinders 18 to ignite a lower cetane fuel or could rely upon various combinations of spark-ignition, compression-ignition, or prechamber ignition without limitation. Engine system 10 also includes an electronic control unit or ECU 22 that is in control communication with fuel injectors 26 and with other components of dual fuel system 24 including pumps and electrically actuated valves as further discussed herein.

Dual fuel system 24 further includes an overflow buffer 50 arranged to receive a volume of the second fuel expelled from second fuel conduit 32, and a valve 52 movable from a closed position to an open position fluidly connecting overflow buffer 50 to second fuel conduit 42. Valve 52 can be electrically actuated, such as solenoid actuated. In other embodiments, valve 52 could be hydraulically or pneumatically actuated, for example. Valve 52 may be normally closed. Overflow buffer 50 can include a tank or other structure forming a volume that can accommodate a pulse of expelled fuel to assist in rapidly reducing a fuel supply pressure of the second fuel, and thereby hasten switchover of engine system 10 from operating on a fuel having a first fuel composition to operating on a fuel having a second fuel composition, as further discussed herein.

Figure 2:
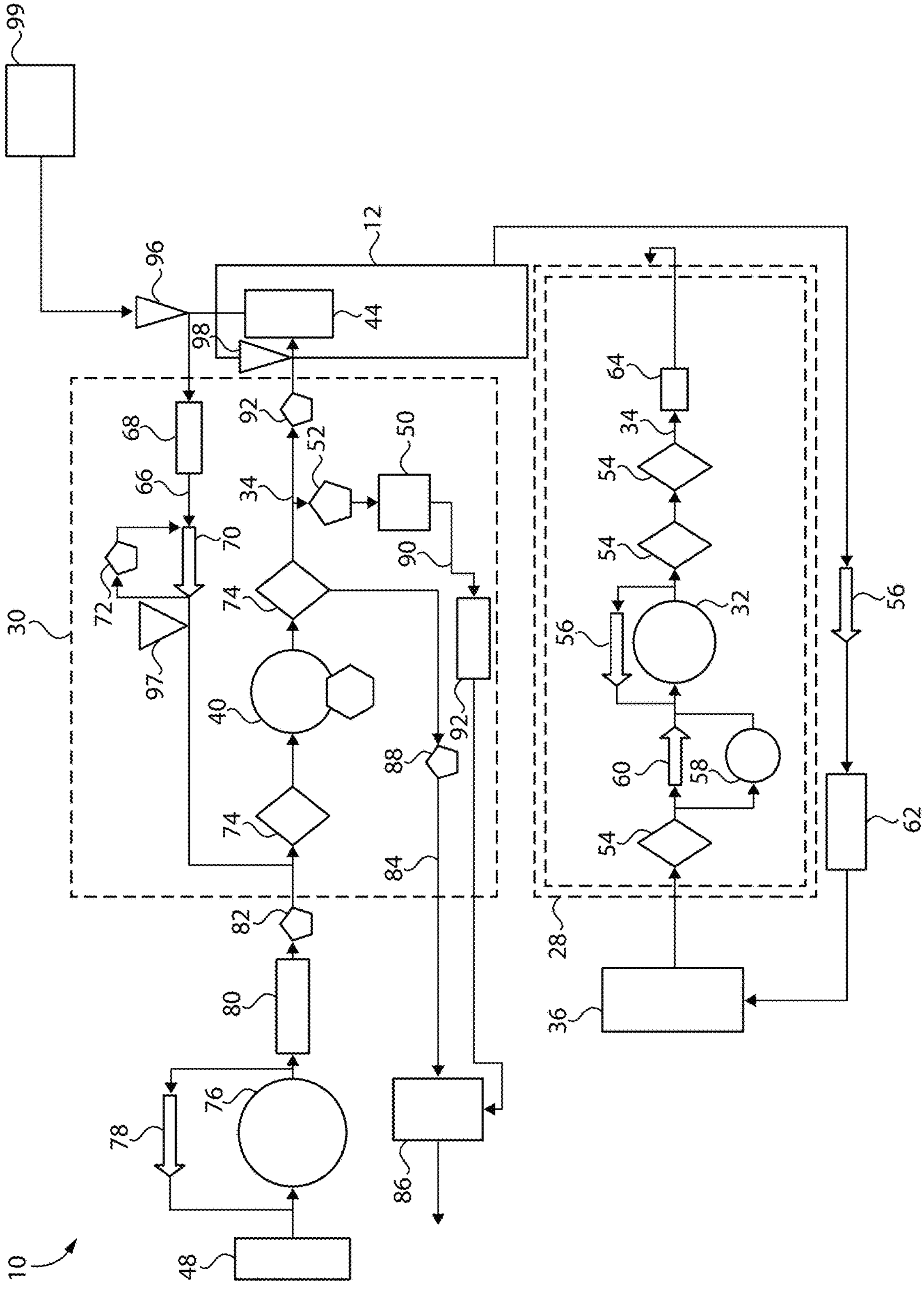
FIG. 2 is a schematic view of portions of the engine system of FIG. 1.

Referring also now to FIG. 2, there are shown additional features of engine system 10 including first fuel subsystem 28 and second fuel subsystem 30. Focusing on first fuel subsystem 28, there is shown first fuel conduit 34 extending between first fuel supply 36 and engine 12. It will be recalled engine 12 includes cylinder head 20. First fuel conduit 34 may extend through cylinder head 20 to fluidly connect to each of fuel injectors 26. First fuel subsystem 28 also includes a plurality of fuel filters 54, a plurality of regulators 56, an additional pump 58 fluidly connecting between fuel pump 32 and fuel supply 36 and in parallel with a bypass 60. First fuel conduit 34 extends to a block 64, and feeds the first fuel at a supply pressure to fuel injectors 36.

Focusing on second fuel subsystem 30, there is shown second fuel conduit 34 extending to manifold 44. Manifold 44 distributes the second fuel to fuel injectors 26 as discussed herein. Second fuel subsystem 30 also includes a recirculation return line conduit 66, and a fuel cooler 68 within conduit 66. A regulator 70 is also within conduit 66 in parallel with a normally closed valve 72. Second fuel subsystem 40 also includes a pump 76, a regulator 78, a cooler 80, and a shutoff valve 82. Shutoff valve 82 can be normally open and actuated closed to shutoff a flow of fuel to downstream parts of second fuel subsystem 30, although a normally closed valve actuated closed could also be used. Another return line is shown at 84 to receive a feed of fuel from second fuel conduit 34 and includes therein a normally closed valve 88. Filters in second fuel subsystem 30 are shown at numeral 74. It can also be noted second fuel subsystem 30 includes a catch tank 86 receiving a feed from return line 84. Catch tank 86 will be separate from either the first fuel supply 36 or second fuel supply 48.

Second fuel subsystem 30 also includes a buffer conduit 90 extending via a drain 92 to catch tank 86. First fuel subsystem 30 also includes one or more purging inlets 96, 97, and 98. A purging fluid supply 99 containing, for example, nitrogen, can be used to supply fluid for purging second fuel subsystem 30 into purging inlets 96, 97, 98. In an embodiment, valves 92, 82, and 88 can all be positioned in a closed state to enable purging fluid to be fed through conduit 66, and into second fuel conduit 34, ultimately into conduit 90 by way of buffer 50. Purging inlet 98 may be positioned at a location that is fluidly between valve 92 and manifold 44.

Figure 3:
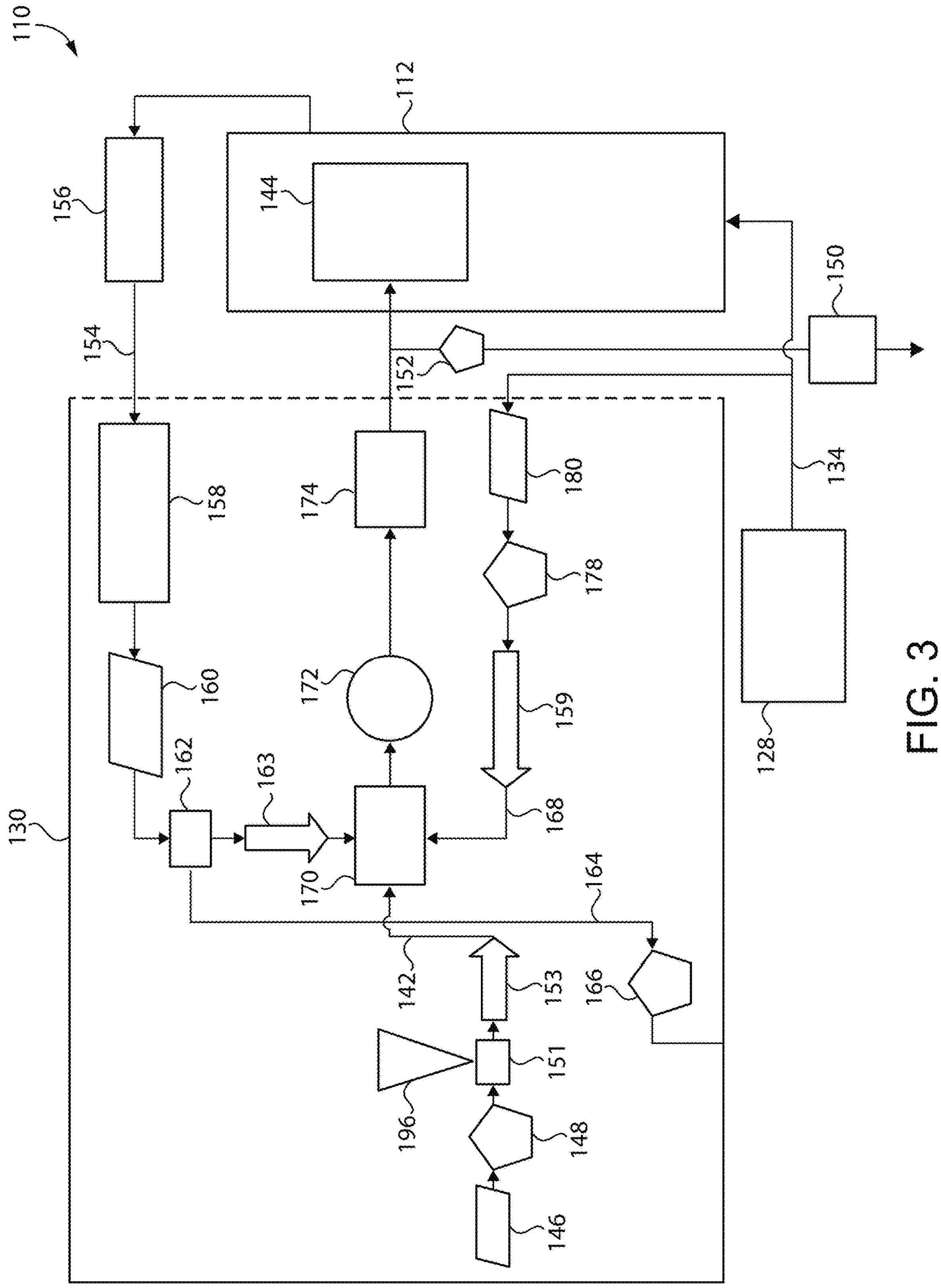
FIG. 3 is a schematic view of portions of an internal combustion engine system, according to another embodiment.

Turning now to FIG. 3, there is shown an internal combustion engine system 110 according to another embodiment, and having certain similarities with embodiments discussed above but also certain differences. In FIG. 3 a first fuel subsystem, including for example a diesel fuel subsystem, is shown at 28. A second fuel subsystem including, for example, a methanol fuel subsystem, is shown at 130. First fuel subsystem 128 supplies a first fuel by way of a first fuel conduit 134 to an engine 112. Second fuel subsystem 130 supplies a second fuel by way of a second fuel conduit 142 to engine 112, such as by way of a manifold 144. Engine system 110 also includes a cross-feed conduit 168 that fluidly connects first fuel conduit 134 to second fuel conduit 142. Engine system 110 may also include, within second fuel conduit 142, a flowmeter 146, a fuel metering valve 148, a tee connection 151, and a check valve 153. Check valve 153 may be movable to an open position permitting a flow of the second fuel through second fuel conduit 142. Another check valve 159 is within cross-feed conduit 168 and movable to an open position to permit a flow of the first fuel to second fuel conduit 142. A flowmeter 180 and a metering valve 178 may also be within cross-feed conduit 168. Cross-feed conduit 168 extends to an electrically actuated cross-valve assembly 170 arranged to selectively provide each and any of a feed of the first fuel, the second fuel, or a blend of the first fuel and the second fuel, to manifold 144.

A circulation pump 172 and a mixer 174 are within second fuel conduit 142 at locations fluidly between cross-valve assembly 170 and manifold 144. Second fuel subsystem 130 also includes a droplet measurement mechanism at 156 and a recirculation conduit 154 extending from droplet measurement 156 to a cooler 158, to a flowmeter 160, to a tee 162, and by way of a check valve 163 to cross-valve assembly 170. From tee 162 a purge line 164 extends to a purge valve 166. A purge inlet 196 is shown further connected to second fuel conduit 142 at tee 151.

Second fuel subsystem 130 further includes an overflow buffer 150 and a valve 152 that is normally closed and, for example, electrically actuated, movable to an open position to fluidly connect second fuel conduit 142 to buffer 150. Cross-valve assembly 170 is arranged fluidly between purging inlet 196 and manifold 144. Buffer 150 thus fluidly connects to second fuel conduit 142 at a location that is fluidly between cross-valve assembly 170 and manifold 144. The first fuel and the second fuel can be blended at cross-valve assembly 170. When switching to operation on only or substantially only the first fuel, for example, the second fuel or a blend of the second fuel and the first fuel, can be purged from cross-valve assembly 170, pump 172, mixer 174, and manifold 144, by way of the first fuel fed via cross-feed conduit 168.

INDUSTRIAL APPLICABILITY

Referring to the drawings generally, operating an engine system according to the present disclosure can include feeding a fuel having a first fuel composition into a plurality of fuel injectors. As discussed herein, fuel injectors 26 shown in FIG. 1 will receive a feed of the first fuel, the second fuel, or a blend of the first fuel and the second fuel. The fuel having the first fuel composition can be injected from the plurality of fuel injectors into an engine for combustion. Operating an engine system according to the present disclosure can also include feeding a fuel having a second fuel composition into a plurality of fuel injectors. As also discussed above, fuel injectors 36 can receive a feed of the first fuel, the second fuel, or a blend of the first fuel and the second fuel. It will thus be appreciated that a first fuel composition and a second fuel composition contemplate a first and second fuel type, or potentially a first and a second fuel blend ratio. The fuel having the second fuel composition is injected from the plurality of fuel injectors into the engine for combustion.

At various times during operation, it can be desirable to switch fuel types. For instance, when a load demand occurs requiring an increased power output of an engine it can be desirable to switch from operation on methanol to operation on diesel to rapidly and reliably satisfy the increased load demand. When a dual fuel system is operating on one fuel, such as methanol, the supply pressure of the methanol and the presence of the methanol within the system can limit how quickly switchover to diesel can occur. According to the present disclosure, a valve, such as valve 52 in engine system 10 or valve 152 in engine system 110, can be opened to expel fuel having a first fuel composition so as to hasten the switchover to a second fuel having a second fuel composition.

Thus, operation of an engine system in this manner can be understood as quickly expelling one fuel and rapidly reducing the supply pressure of the one fuel faster than would otherwise occur by slowing down or turning off a fuel supply pump. As a result, the fuel having the second fuel composition can be quickly supplied into the fuel injectors to commence operation on the fuel having the second fuel composition. While one application of the present disclosure is contemplated to be switching from a dual fuel mode injecting both methanol and diesel, or a blend of other fuels, and rapidly switching to a diesel only mode, the present disclosure is not thereby limited. Other applications could include switching from a first fuel blend to a second fuel blend, switching from diesel to methanol, or still another variation.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A dual fuel system comprising:

a plurality of fuel injectors;

a first fuel pump for a first fuel, and a first fuel conduit extending between the first fuel pump and the plurality of fuel injectors;

a second fuel pump for a second fuel, and a second fuel conduit extending between the second fuel pump and a fuel manifold fluidly connected to the plurality of fuel injectors; and an overflow buffer arranged to receive a volume of the second fuel expelled from the second fuel conduit to hasten switchover of the engine from operation on the second fuel to operation on the first fuel, and a valve movable from a closed position to an open position fluidly connecting the overflow buffer to the second fuel conduit;

wherein each respective one of the plurality of fuel injectors is arranged to inject the first fuel and the second fuel for combustion in a plurality of cylinders in an engine.

2. The dual fuel system of claim 1 further comprising a first fuel supply fluidly connected to the first fuel pump, a second fuel supply fluidly connected to the second fuel pump, and a catch tank separate from the first fuel supply and the second fuel supply.

3. The dual fuel system of claim 1 further comprising a cross-feed conduit that fluidly connects the first fuel conduit to the second fuel conduit.

4. The dual fuel system of claim 3 further comprising a check valve in the cross-feed conduit movable to an open position to permit a flow of the first fuel to the second fuel conduit.

5. The dual fuel system of claim 1 further comprising an electrically actuated cross-valve assembly arranged to selectively provide each of a feed of the first fuel, the second fuel, or a mix of the first fuel and the second fuel, to the manifold.

6. The dual fuel system of claim 5 wherein the second fuel conduit includes a purging inlet, and the electrically actuated cross-valve assembly is arranged fluidly between the purging inlet and the overflow buffer.

7. The dual fuel system of claim 5 wherein the overflow buffer fluidly connects to the second fuel conduit at a location that is fluidly between the cross-valve assembly and the manifold.

8. The dual fuel system of claim 1 wherein the dual fuel system further includes a normally closed shutoff valve positioned fluidly between the overflow buffer and the manifold.

9. The dual fuel system of claim 8 further comprising a transfer pump, and the overflow buffer fluidly connects to the second fuel conduit at a location that is fluidly between the transfer pump and the normally closed shutoff valve.

10. A dual fuel engine system comprising:

an engine including an engine housing having a plurality of cylinders formed therein;

a dual fuel system including a first fuel conduit for a first fuel, a second fuel conduit for a second fuel, and a plurality of fuel injectors each arranged to inject the first fuel and the second fuel into the engine for combustion in the plurality of cylinders; and the dual fuel system further including an overflow buffer, and a normally closed valve movable from a closed position to an open position fluidly connecting the second fuel conduit to the overflow buffer to receive a volume of the second fuel expelled from the second fuel conduit and hasten switchover of the engine from operation on the second fuel to operation on the first fuel.

11. The engine system of claim 10 wherein the engine housing includes a cylinder head, and the first fuel conduit extends through the cylinder head to fluidly connect to each of the plurality of fuel injectors.

12. The engine system of claim 10 wherein the dual fuel system further includes a cross-feed conduit that fluidly connects the first fuel conduit to the second fuel conduit, a check valve in the cross-feed conduit movable to an open position to permit a flow of the first fuel to the second fuel conduit, and a fuel metering valve in the cross-feed conduit.

13. The engine system of claim 12 wherein the dual fuel system further includes a cross-valve assembly arranged to provide each of a feed of the first fuel, the second fuel, or a mix of the first fuel and the second fuel through the second fuel conduit to the plurality of fuel injectors.

14. The engine system of claim 13 wherein the dual fuel system further includes a purging inlet, and the cross-valve assembly is arranged fluidly between the purging inlet and the overflow buffer.

15. The engine system of claim 10 wherein the dual fuel system further includes a normally closed shutoff valve positioned fluidly between the overflow buffer and the plurality of fuel injectors.

16. The engine system of claim 10 wherein the dual fuel system further includes a plurality of fuel pressurization plungers for the plurality of fuel injectors.

17. A method of operating an engine system comprising:

feeding a fuel having a first fuel composition into a plurality of fuel injectors;

injecting the fuel having the first fuel composition from the plurality of fuel injectors into the engine for combustion;

feeding a fuel having a second fuel composition into the plurality of fuel injectors;

injecting the fuel having the second fuel composition from the plurality of fuel injectors into the engine for combustion;

opening a valve to expel the fuel having the first fuel composition from a fuel supply conduit to an overflow buffer; and hastening switchover of the engine from operation on the fuel having the first fuel composition to operation on the fuel having the second fuel composition, based on the opening the valve to fluidly connect the fuel supply conduit to the overflow buffer.

18. The method of claim 17 wherein the opening the valve includes opening a normally closed valve, and the hastening switchover includes hastening switchover based upon a reduction to a supply pressure of the fuel having the first fuel composition based on the opening the normally closed valve.

19. The method of claim 18 wherein the fuel having the first fuel composition includes a blend of a first fuel and a second fuel, and the fuel having the second fuel composition includes substantially only one of the first fuel or the second fuel.

20. The method of claim 17 further comprising feeding the fuel having the second fuel composition into the fuel supply conduit during the switchover of the engine.

* * * * *